(12) United States Patent
Amitai

(10) Patent No.: US 8,811,823 B2
(45) Date of Patent: Aug. 19, 2014

(54) DYNAMIC OPTICAL DEVICES

(75) Inventor: Yaakov Amitai, Rehovot (IL)

(73) Assignee: Beamus, Ltd., Rehovot (IL)

( * ) Notice: Subject to any disclaimer, the term of this patent is extended or adjusted under 35 U.S.C. 154(b) by 354 days.

(21) Appl. No.: 12/247,878

(22) Filed: Oct. 8, 2008

(65) Prior Publication Data

US 2009/0310963 A1  Dec. 17, 2009

Related U.S. Application Data

(62) Division of application No. 10/311,564, filed on Jun. 10, 2003, now Pat. No. 7,460,302.

(51) Int. Cl.
  *H04J 14/02* (2006.01)
  *G02B 5/18* (2006.01)
  *G02F 1/035* (2006.01)
  *G02B 6/293* (2006.01)
  *G02B 6/12* (2006.01)

(52) U.S. Cl.
  CPC .......... *G02F 1/035* (2013.01); *G02B 6/29304* (2013.01); *G02B 6/1203* (2013.01); *H04J 14/02* (2013.01); *G02B 5/1866* (2013.01); *G02F 2201/305* (2013.01)
  USPC .............................. 398/84; 359/573; 359/569

(58) Field of Classification Search
  CPC ............ G02B 6/12007; G02B 6/1203; G02B 6/29304; G02B 6/12164; G02B 5/1828; H04J 14/02; H04J 14/0227
  USPC ..................... 359/569, 573, 575, 576; 398/84
  See application file for complete search history.

(56) References Cited

U.S. PATENT DOCUMENTS

| | | | |
|---|---|---|---|
| 3,942,048 A | 3/1976 | Laude et al. | |
| 4,115,747 A | 9/1978 | Sato et al. | |
| 5,029,154 A | 7/1991 | Sumi et al. | |
| 5,101,389 A | 3/1992 | Ohuchida et al. | |
| 5,107,359 A * | 4/1992 | Ohuchida | 398/79 |
| 5,162,656 A | 11/1992 | Matsugu et al. | |
| 5,742,433 A | 4/1998 | Shiono et al. | |
| 5,825,523 A * | 10/1998 | Amitai | 359/209.1 |
| 5,977,539 A | 11/1999 | Holzapfel et al. | |
| 7,460,302 B2 * | 12/2008 | Amitai | 359/573 |

FOREIGN PATENT DOCUMENTS

| | | |
|---|---|---|
| DE | 44 20 389 | 5/1994 |
| EP | 0 046 248 | 10/1990 |

* cited by examiner

*Primary Examiner* — Audrey Y Chang

(57) ABSTRACT

The invention provides an optical device, including a light-transmissive substrate, and a pair of different, parallel gratings including a first grating and second grating, located on the substrate at a constant distance from each other, each of the pair of parallel gratings including at least one sequence of a plurality of parallel lines, wherein the spacings between the lines gradually increase from one edge of the grating up to a maximum distance between the lines, and wherein the arrangement of lines in the second grating is in the same direction as that of the first grating. A system utilizing a plurality of such optical devices is also disclosed.

17 Claims, 12 Drawing Sheets

DYNAMIC OPTICAL DEVICES

This application is a division of application Ser. No. 10/311,564 filed on Jun. 10, 2003 for Dynamic Optical Devices.

FIELD OF THE INVENTION

The present invention relates to diffractive optical devices (DOEs), and to devices which include a plurality of chirped diffractive optical elements carried by a common light-transmissive substrate.

The present invention is capable of being implemented in a large member of applications. For purposes of example only, implementations in division multiplexing/demultiplexing systems, compact optical switches and compact optical scanners are indicated herein.

BACKGROUND OF THE INVENTION

Recently, there have been significant advances in optical fiber technology for telecommunication systems. One of the proposed methods of exploiting the high potential bandwidth of optical fibers more efficiently, is by wavelength division multiplexing (WDM). With this technique, a large number of communication channels can be transmitted simultaneously over a single fiber. Various systems for implementing WM have been proposed, including systems based on birefringent materials, surface relief gratings, Mach-Zender interferometry and waveguides. These proposed systems generally suffer from low efficiencies, or from a strict limitation on the number of possible channels.

Another proposed approach is to use a thick reflection hologram. However, the necessity to use a conventional aspheric lens for collimating and/or focusing the light waves makes such systems bulky and space consuming. Furthermore, a single holographic element is very sensitive to the signal wavelength, which is usually strongly dependent on temperature.

In many optical systems, scanning of a plane wave over a wide field of view, or linear scanning of a focused beam on a plane, is required. A few examples are angular scanners for Laser-Radar, whereby the transmitted narrow beam is to cover a solid angle much wider than the angular divergence of the beam; aiming systems in which the central aiming point moves as a function of the target range and velocity; linear scanners for laser printers or plotters, and others. In the existing systems, beam steering is performed with conventional optical elements, such as a polygonal mirror or a pair of prisms. These systems suffer from various drawbacks: the scanning unit is relatively large and heavy, limiting the performance of systems in which compactness is a requirement; mass production is quite expensive; the scanning rate is severely limited by the mechanical system; rotating systems usually suffer from wobble which must be restrained in order to allow accurate scanning.

Several proposals have been made to perform beam steering by microlens array translation with either diffractive or refractive lenses. These approaches usually suffer from high aberrations at small f-numbers. In addition, they must rely on fairly complicated and costly equipment, which often limits the performance of the microlens arrays.

DISCLOSURE OF THE INVENTION

It is therefore a broad object of the present invention to provide a compact, relatively inexpensive, accurate and simple beam steering optical device having a high scanning rate.

It is a further object of the invention to provide a compact, relatively inexpensive, accurate and simple optical device for wavelength division multiplexion/demultiplexion having high spectral separation.

It is a still further object of the invention to provide an optical device having a substrate wherein a slight change in the refractive index of the substrate will cause an angular deviation in the output beam.

It is a still further object of the invention to provide an optical device providing a large deviation coefficient, so that with a minute refractive index change, significant deviation in the output beam is achieved.

In accordance with the present invention, there is therefore provided an optical device, comprising a light-transmissive substrate, and a pair of different, parallel gratings including a first grating and a second grating, located on said substrate at a constant distance from each other, each of said pair of parallel gratings comprising at least one sequence of a plurality of parallel lines, wherein the spacings between said lines gradually increase from one edge of the grating up to a maximum distance between said lines, and wherein the arrangement of lines in said second grating is in the same direction as that of said first grating.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 1a, 1b, 1c, 1d, 1e, 1f, 1g and 1h illustrate the geometry of some possible embodiments of a device according to the present invention;

Figure 2A:
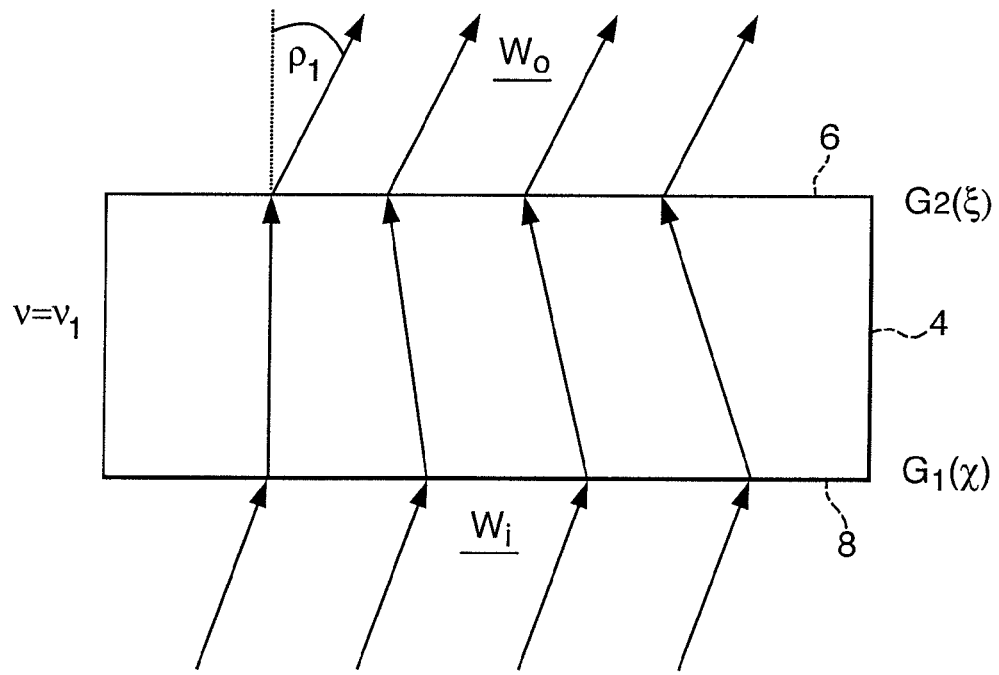
Figure 2B:
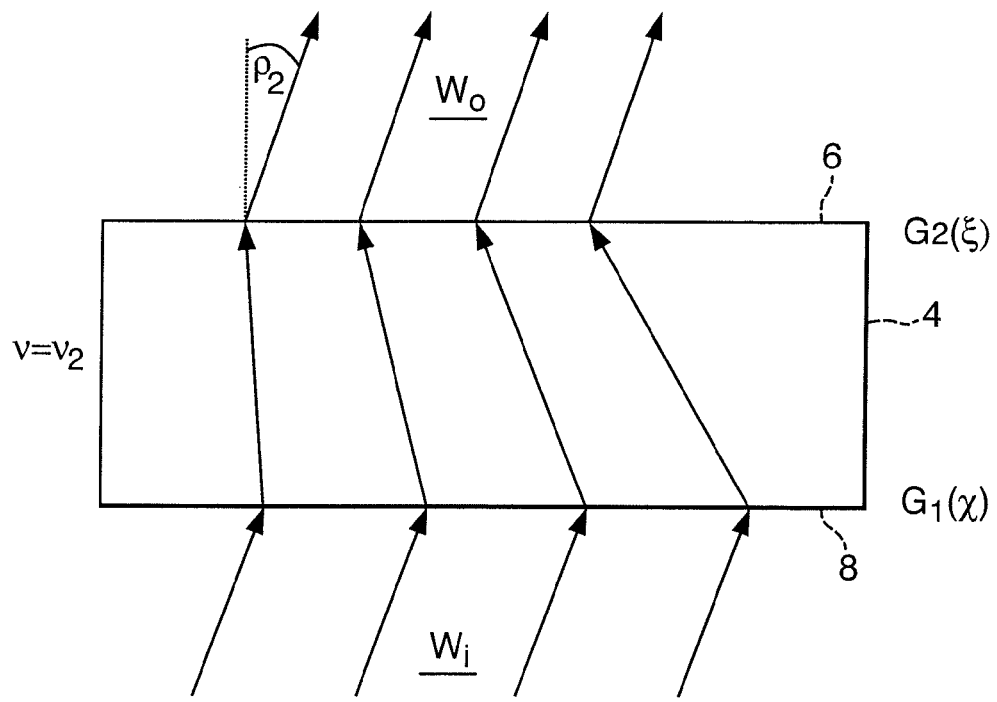
Figure 3:
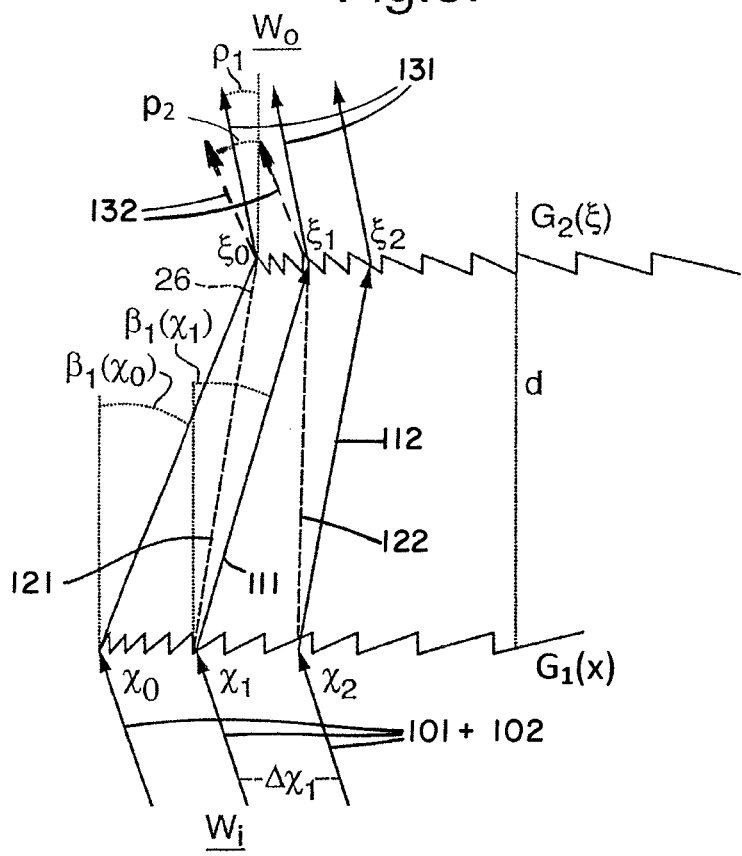
Figure 4:
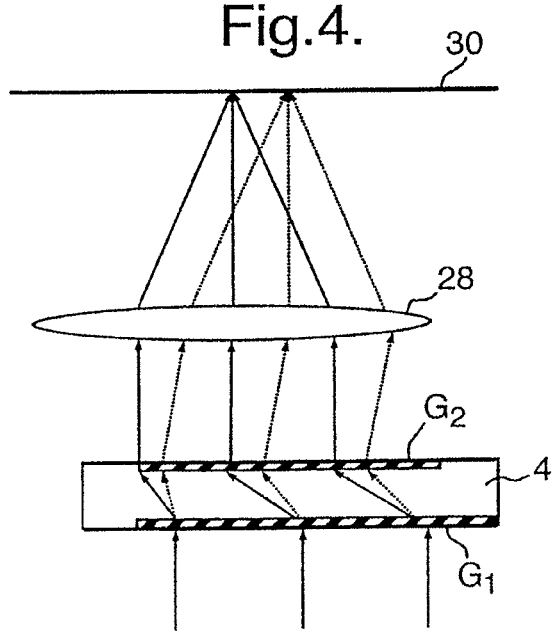
Figure 5:
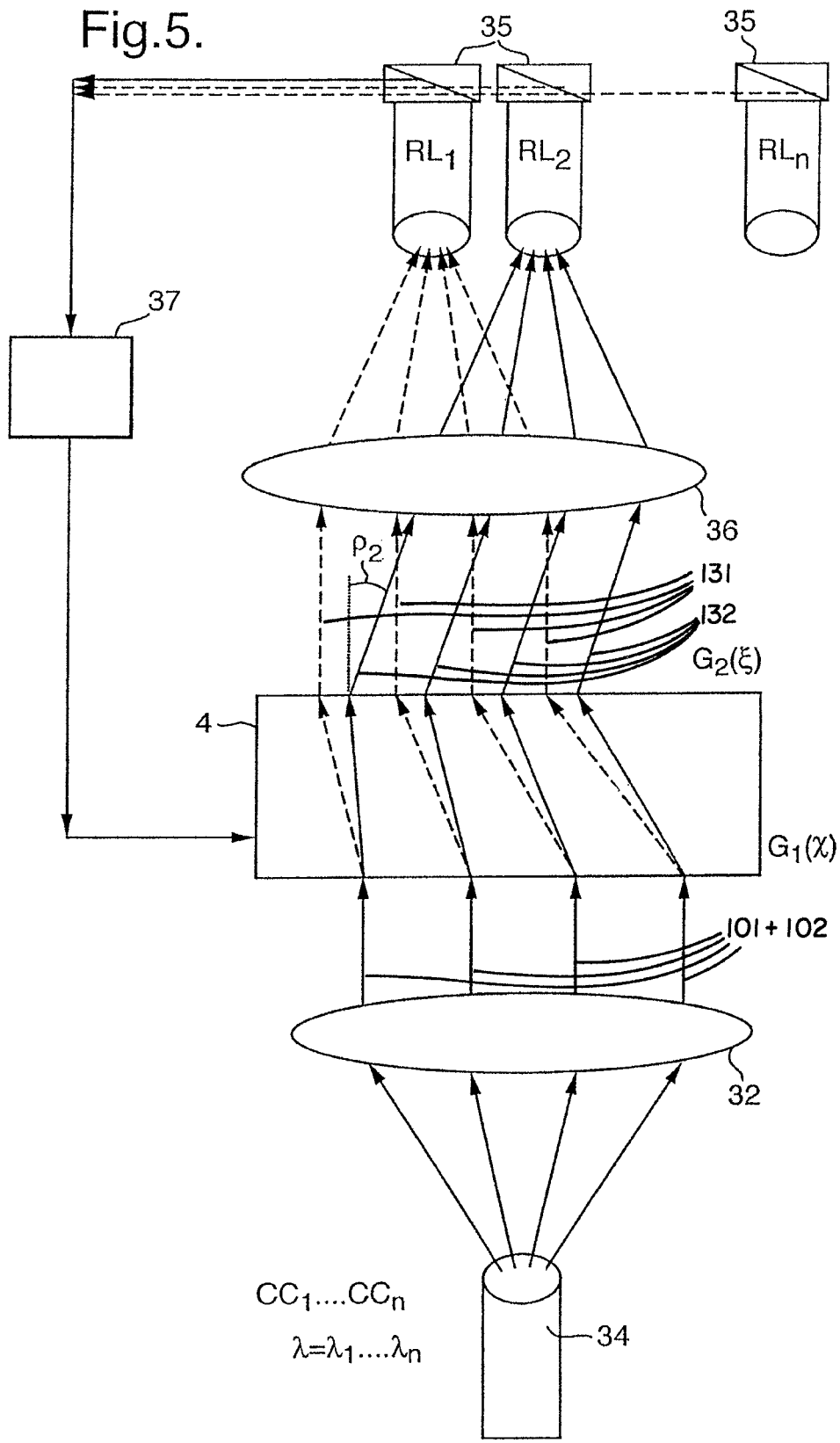
Figure 6B:
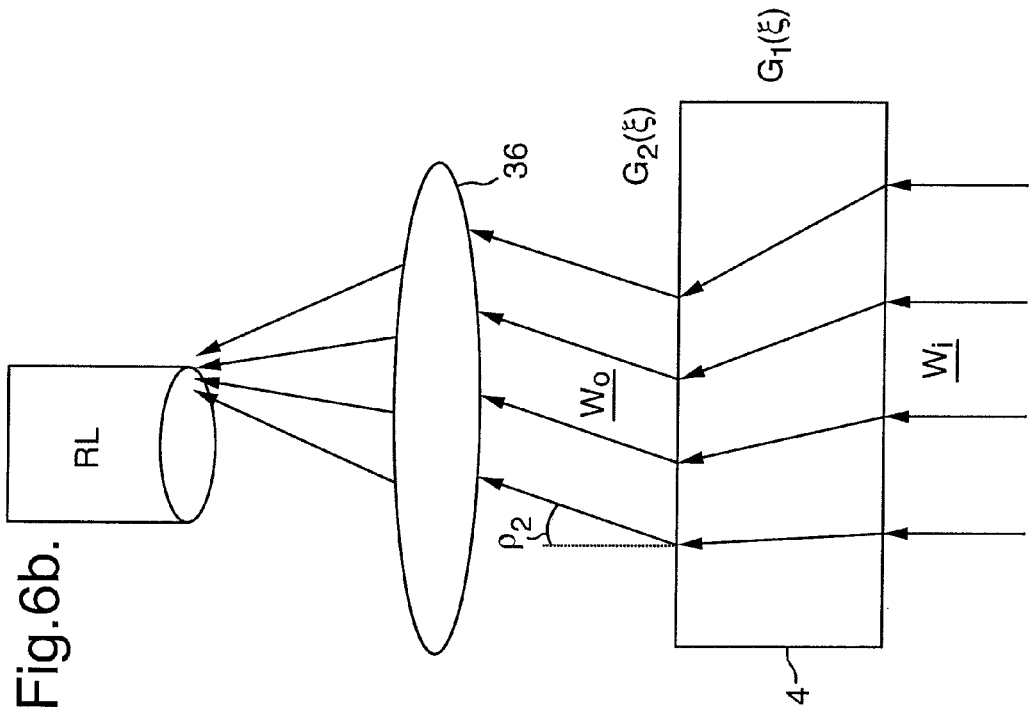
Figure 6A:
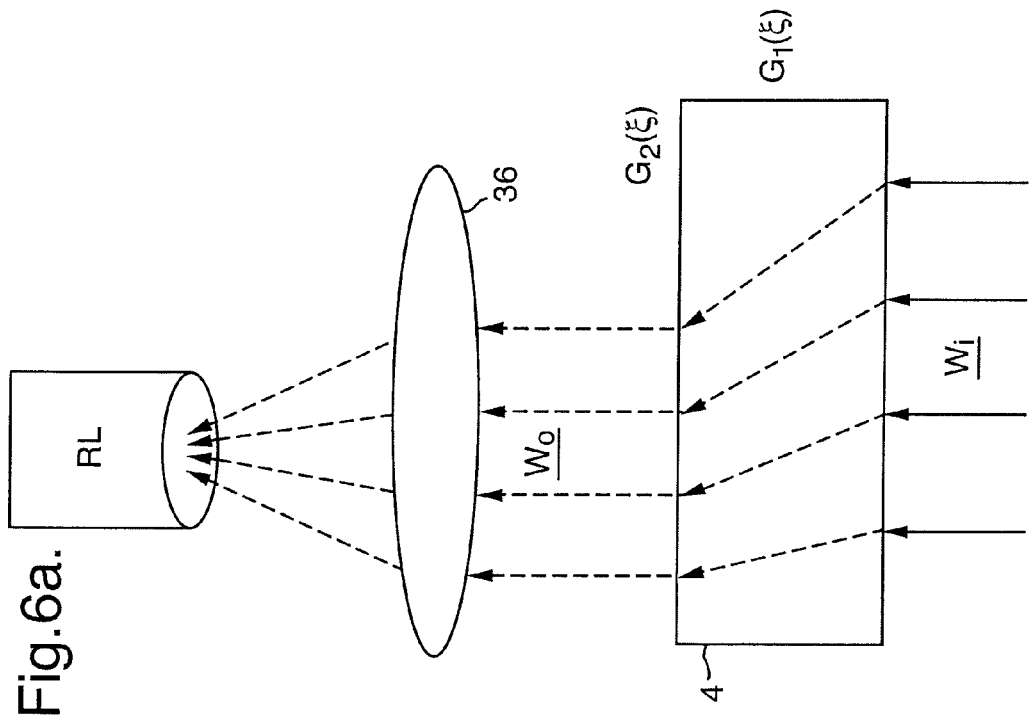
Figure 7:
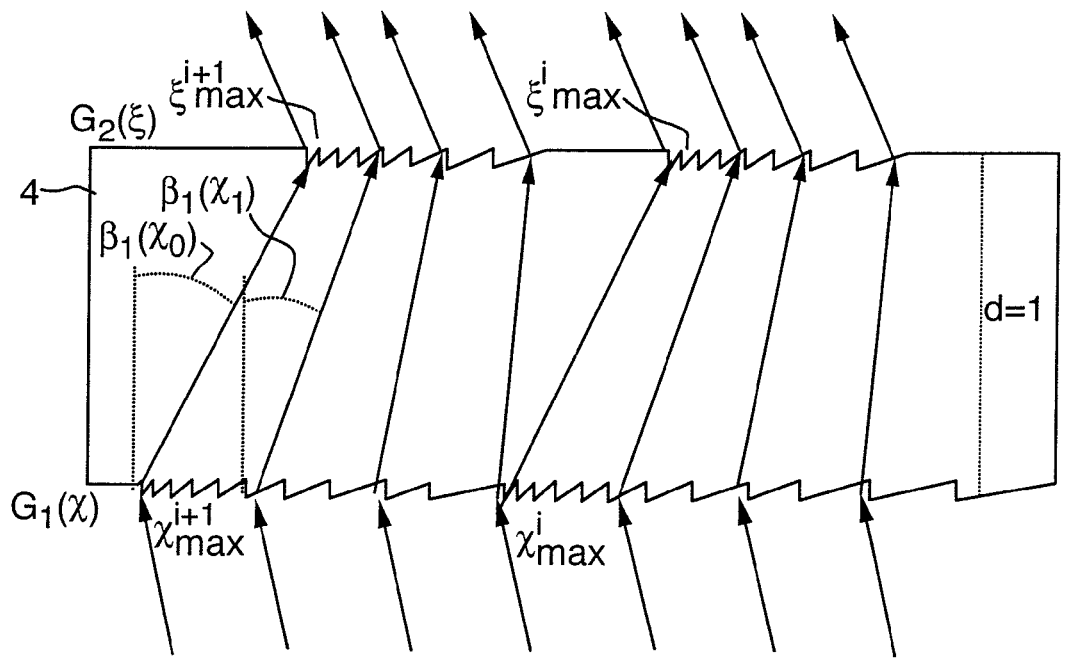
Figure 8:
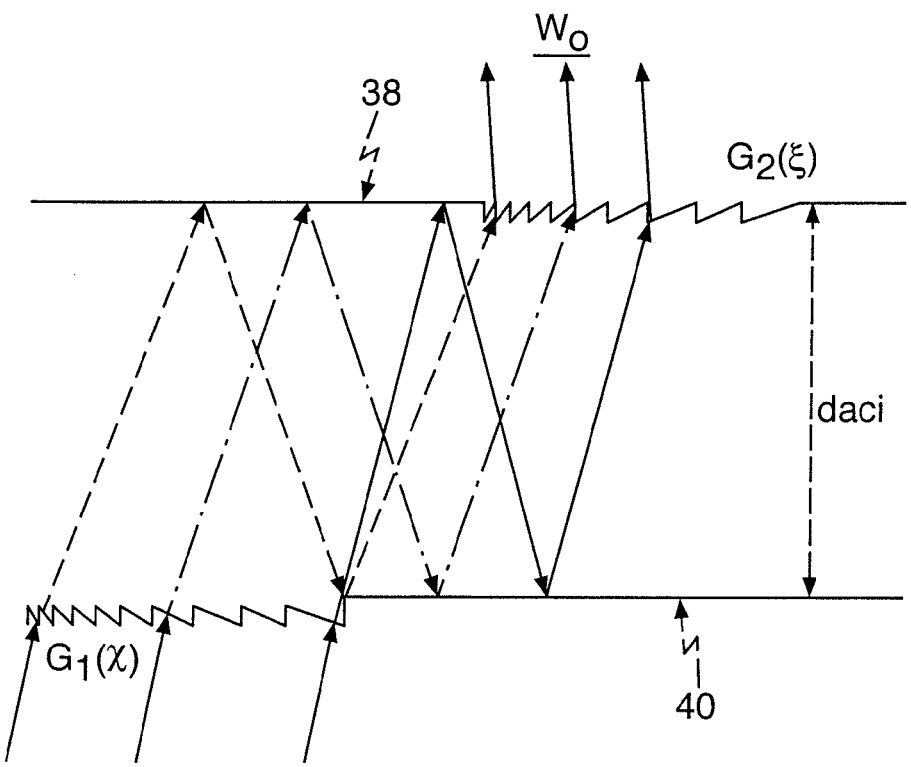
Figure 9:
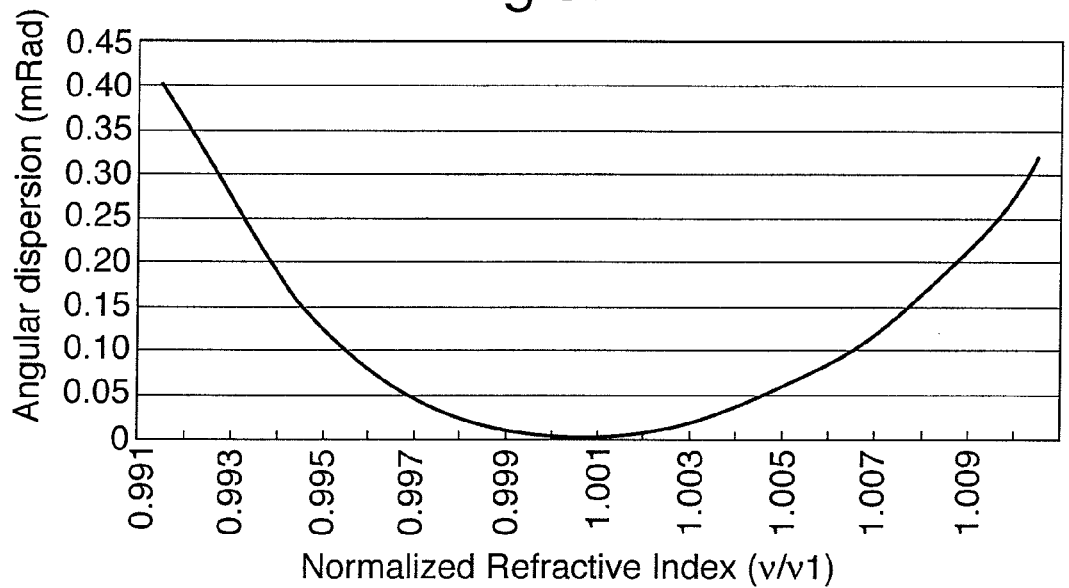
Figure 10:
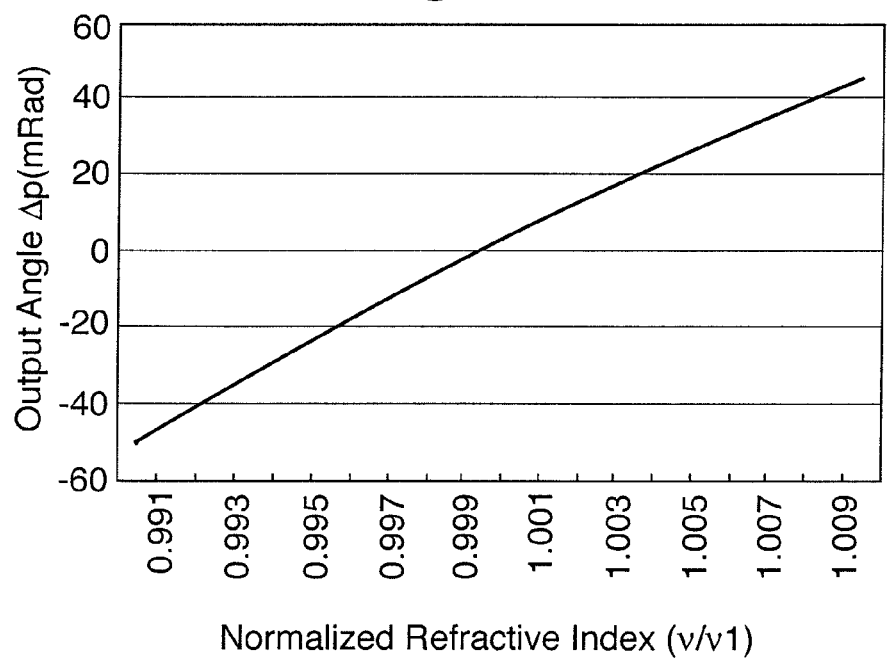
Figure 11:
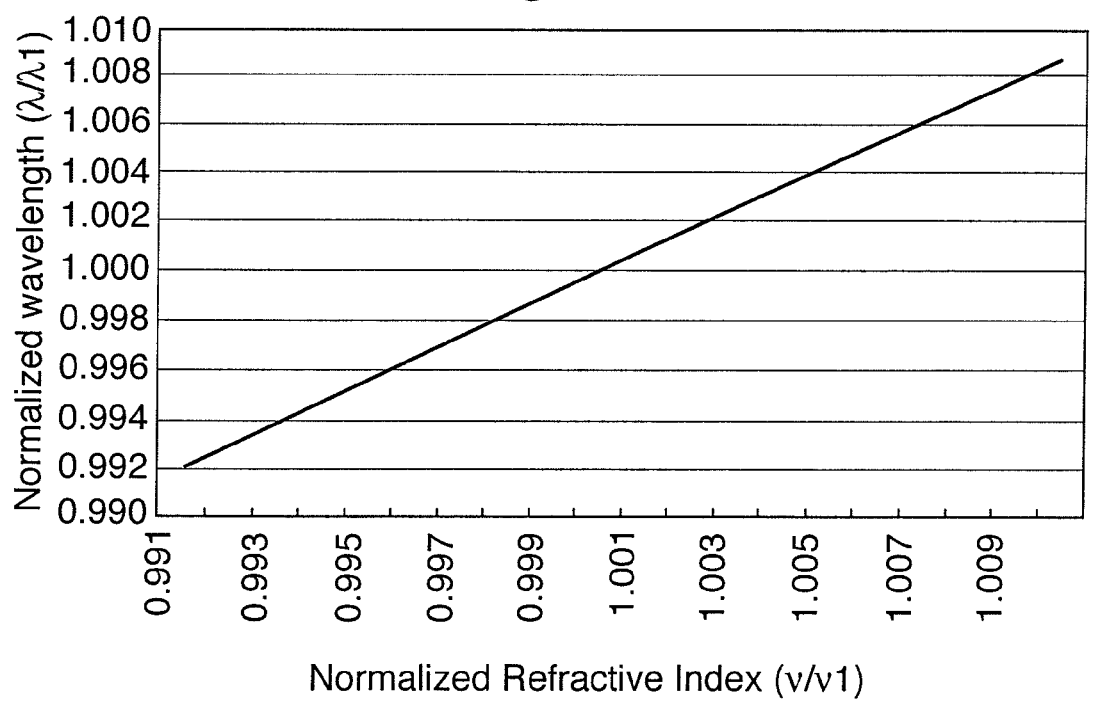
Figure 12A:
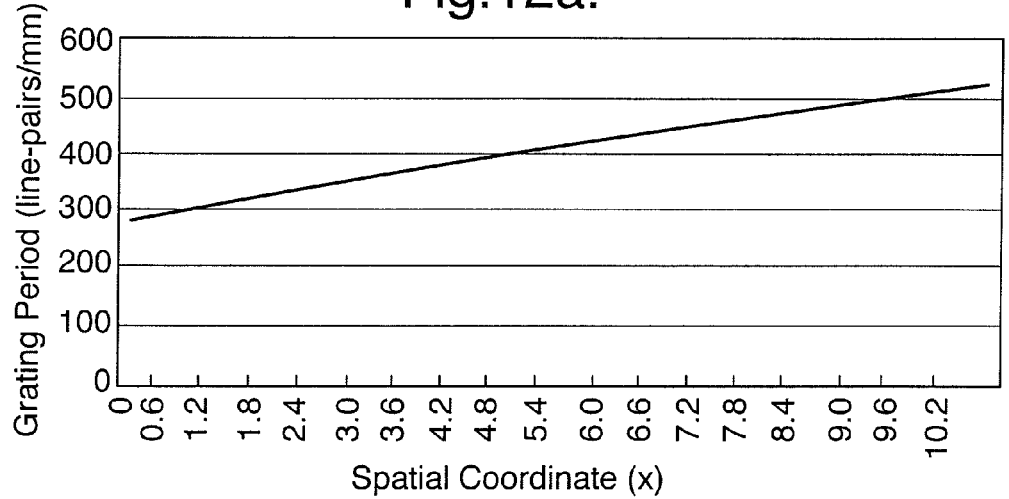
Figure 12B:
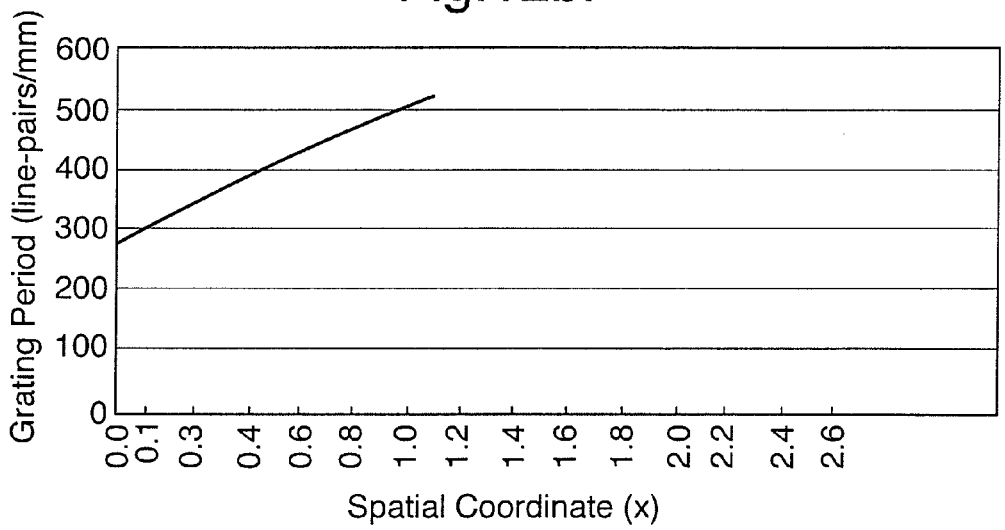
Figure 13:
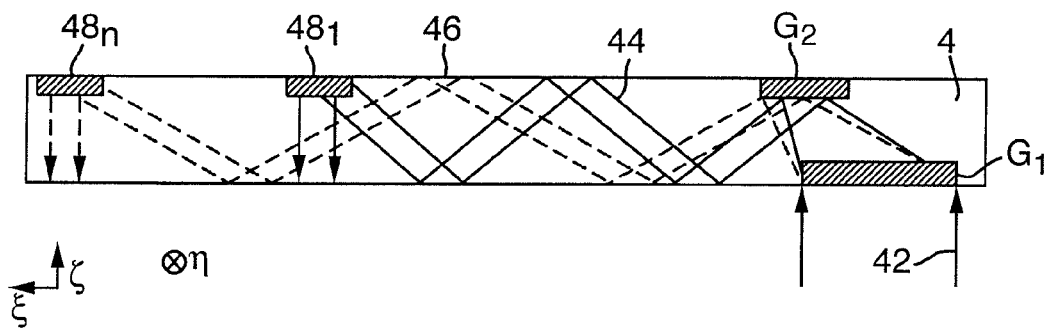
Figure 14:
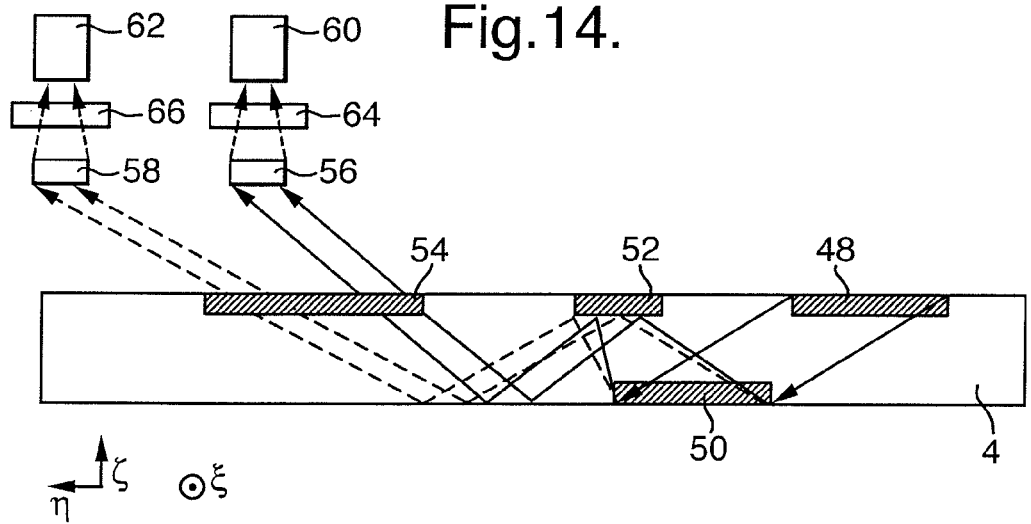
Figure 15:
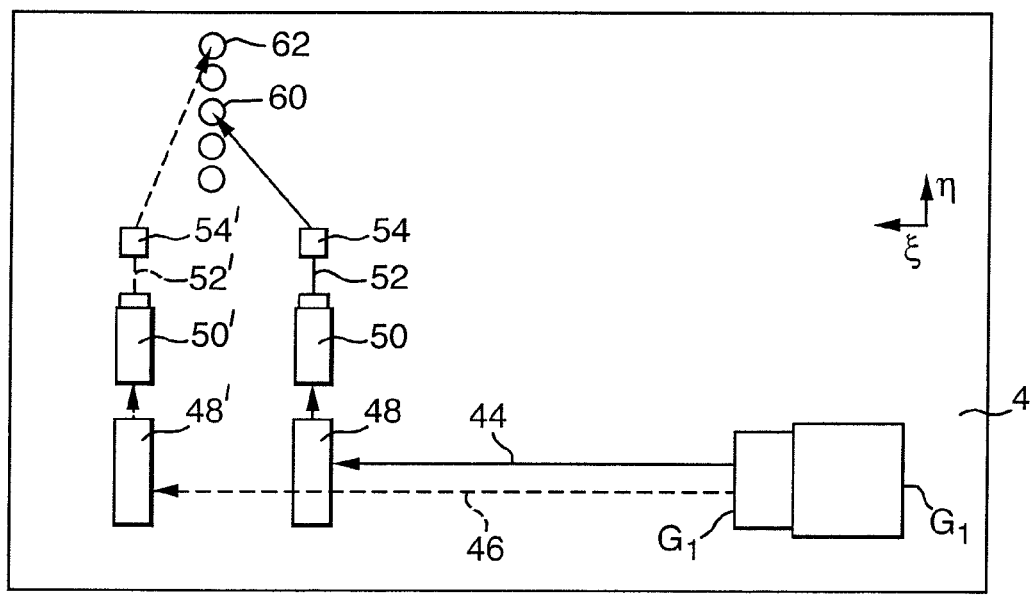
Figure 16:
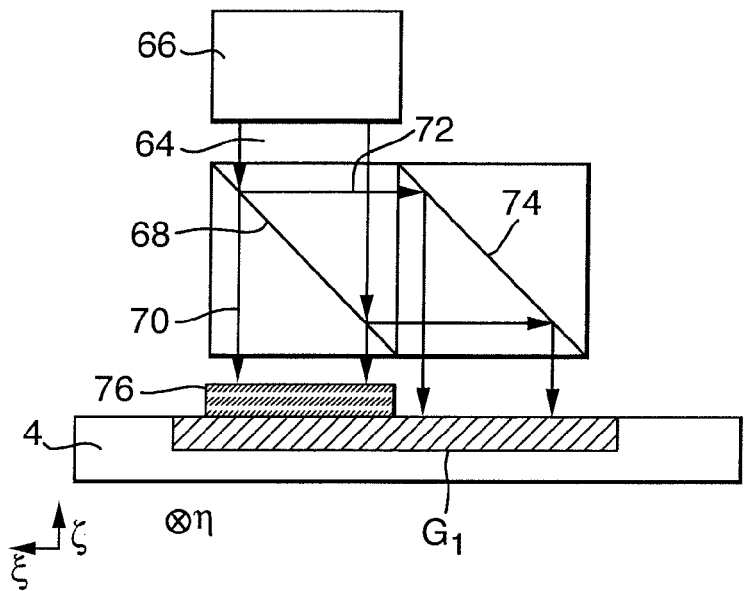
Figure 17:
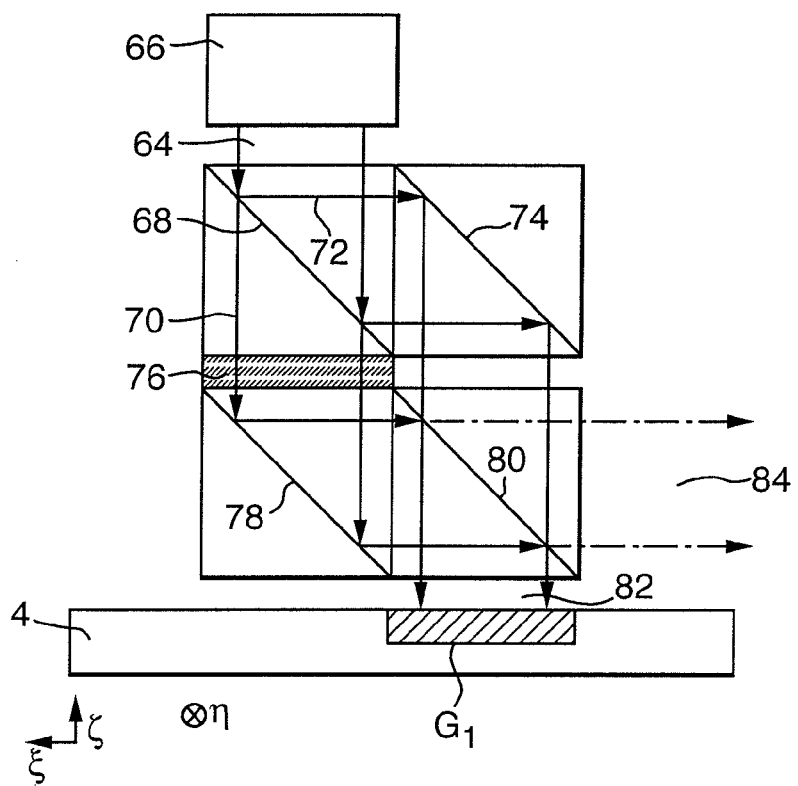

FIGS. 2a and 2b schematically illustrate ray tracing output when passing through two gratings of the device according to the invention;

FIG. 3 schematically illustrates an iterative procedure according to the invention;

FIG. 4 schematically illustrates the conversion of a plane wave to a linear point scanner by means of a focusing lens;

FIG. 5 schematically illustrates the utilization of the double-grating configuration, constructed to provide a wavelength division demultiplexing system;

FIGS. 6a and 6b schematically illustrate the utilization of the double-grating configuration, constructed to be employed for light intensity attenuation or in light amplitude modulation;

FIG. 7 schematically illustrates an array of identical grating couples;

FIG. 8 schematically illustrates a further embodiment for reducing the thickness of the substrate in order to achieve a more compact device;

FIG. 9 is a graph illustrating the results of simulations which calculate the dispersion of a system as a function of the refractive index of the substrate, incorporating the device of the present invention;

FIG. 10 is a graph illustrating the results of simulations which calculate the output angle from the second grating as a function of the refractive index of the substrate, incorporating the device of the present invention;

FIG. 11 is a graph illustrating the results of simulations which calculate the wavelength, at an output angle of ρ=20° as a function of the refractive index of the substrate of the device according to the present invention;

FIGS. 12a and 12b are graphs illustrating the results of simulations which calculate the grating period (in line-pairs/mm) of gratings $G_1$ and $G_2$ as a function of x (FIG. 12a) and ξ (FIG. 12b), respectively;

FIG. 13 is a side view of a first stage of a switching system incorporating a device according to the present invention;

FIG. 14 is a side view of a second stage of the switching system of FIG. 13;

FIG. 15 is a top view of an optical switching system;

FIG. 16 is a schematic diagram illustrating S-polarization of an incoming beam, and FIG. 17 is a schematic diagram illustrating S-polarization of an uniform and symmetrical incoming beam.

DETAILED DESCRIPTION

Figure 1A:
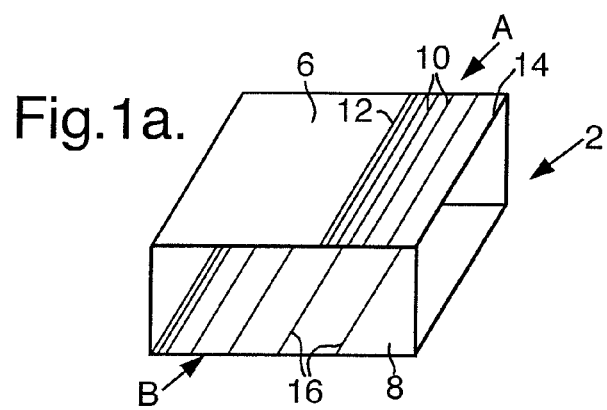

In its simplest form, as shown in FIG. 1a, the optical device 2 of the present invention includes a light-transmissive substrate 4 having two facets or surfaces 6, 8. A plurality of parallel lines 10 are made on surface 6, constituting a first grating A. The spacings between the lines increase from one edge 12 of the surface to its other edge 14, according to mathematical formulae. The arrangement of lines 16 on surface 8 forms a second grating B. The spacings between the parallel lines 16 of second grating B increase in the same direction as those of grating A.

Figure 1B:
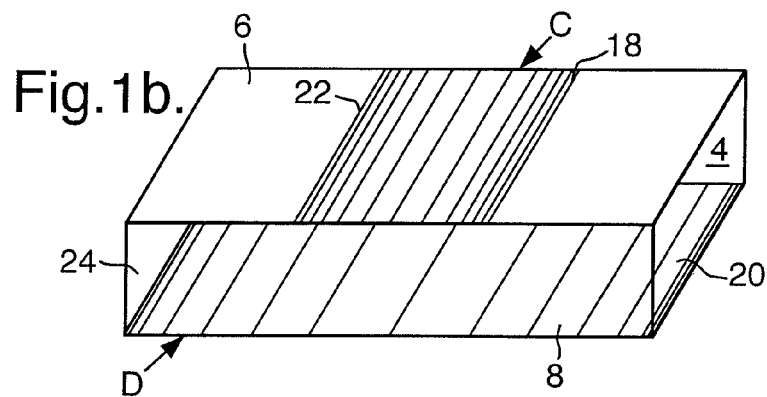

According to the embodiment of FIG. 1b, the surfaces 6 and 8, respectively, bear gratings C and D, each grating being formed of parallel lines, the spacings of which increase from one edge 18 and 20, respectively, of the surfaces to their centers, and then decrease towards the other respective edge 22, 24, in a symmetrical manner.

Figure 1C:
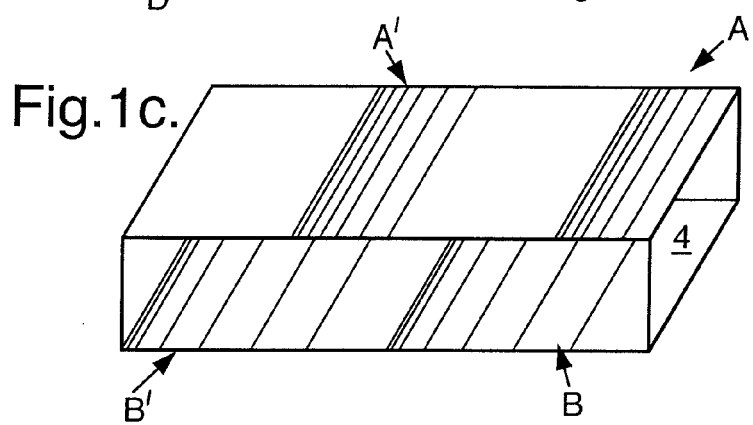
Figure 1D:
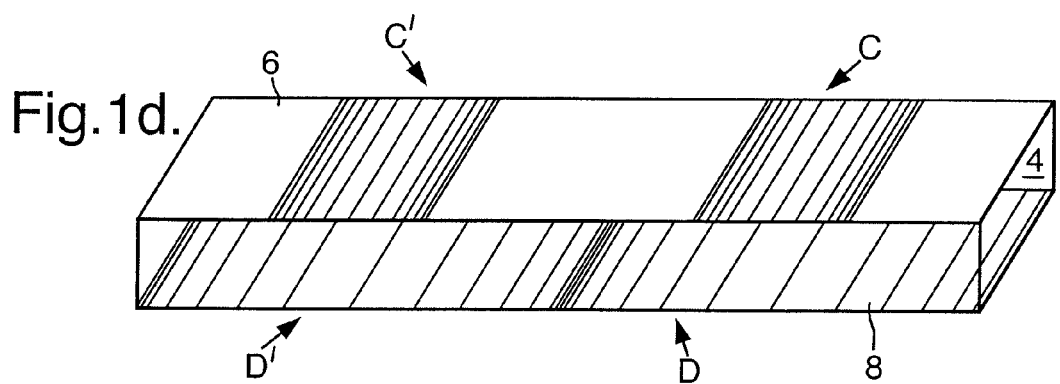

FIG. 1c depicts a modification of the arrangement of FIG. 1b, wherein the substrate 4 bears two gratings A, A' and B, B' according to the arrangement shown in FIG. 1a. Similarly, the substrate of FIG. 1d bears gratings C, C' and D, D' on its surfaces 6 and 8, as in the arrangement shown in FIG. 1b.

Figure 1E:
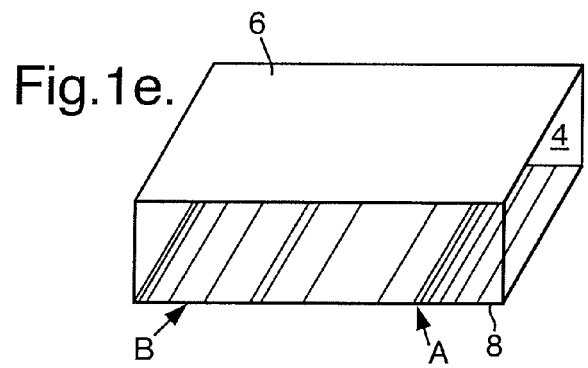
Figure 1F:
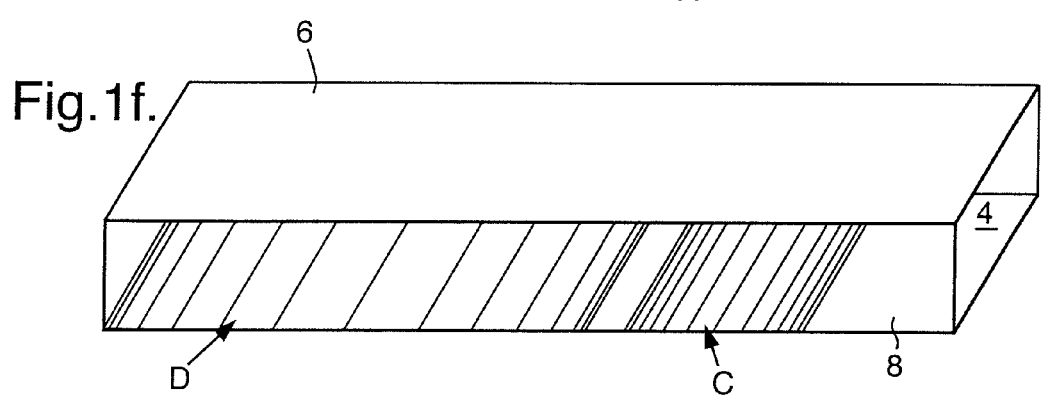
Figure 1G:
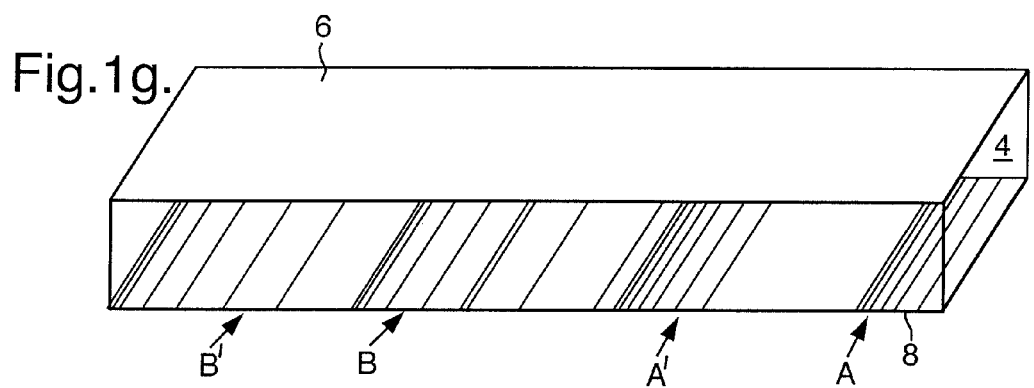
Figure 1H:
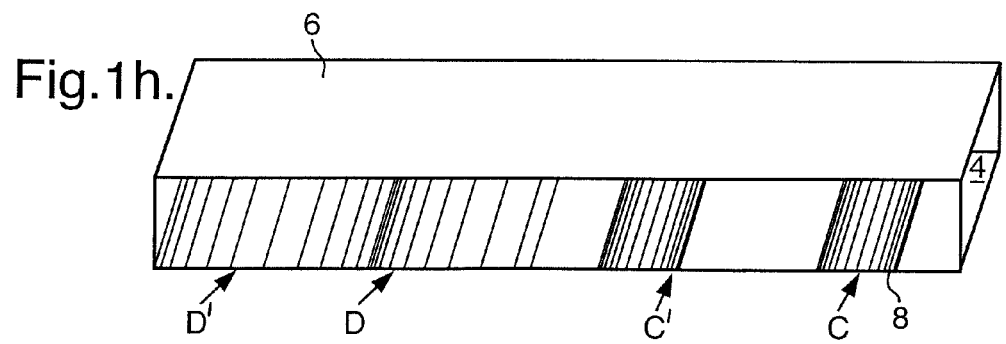

The embodiment of FIG. 1e includes a substrate 4 having gratings A and B as shown in FIG. 1a, formed on a single surface 8. Similarly, FIG. 1f illustrates gratings C and D as in FIG. 1b, formed on surface 8; FIG. 1g illustrates the gratings A, A', B, B' of FIG. 1c, formed on a single surface 8, and FIG. 1h shows gratings C, C', D, D' formed on a single surface 8.

In the double grating system shown in FIGS. 2a and 2b, a monochromatic plane wave W is coupled inside a light-transmissive substrate 4 by a first grating $G_1$ on surface 8 and then is coupled out by the second grating $G_2$ formed on surface 6. The refractive index of the substrate can be dynamically controlled by external means, including, but not limited to, applying an electric field to the substrate or by illumination with a strong short-wavelength light source (not shown). There are many materials with which the electro-optic effect can be used to control the refractive index of the material. One such well-known material is Lithium-Niobate ($LiNbO_3$), which is commercially available and which has a very fast time response, in the order of $10^{-9}$ second. However, many other materials, crystals and polymers, can just as well be used for the desired purpose.

The present invention is intended to provide an optical system wherein a change in the refractive index of the substrate yields an angular deviation of the output wave. That is, when the refractive index is $v_1$, the output wave $W_o$ emerges from the second grating $G_2$ formed on surface 6, at an angle $ρ_1$ with respect to the substrate plane (FIG. 2a). However, when the refractive index is changed to $v_2$, the output wave $W_o$ is deviated by an angle $Δρ$, that is, the output wave emerges from grating $G_2$ at a different angle $ρ_2$ to the substrate plane (FIG. 2b). Hence, a continuous change in the refractive index induces a continuous angular steering of the output wave. This angular steering can be converted into linear scanning of a focused beam by means of an appropriate converging lens.

It is assumed that the input wave $W_i$ which comprises collimated light waves 101,102 impinges on the first grating $G_1$ at an angle $β_o$ to the normal of the substrate. The input and output rays remain in the same meridional plane without any loss of generality. Therefore, the two grating functions are invariant in y (the axis normal to the meridional plane), and depend only on x, the plane of grating $G_1$. The distance d between $G_1$ and $G_2$ is normalized to 1. In the iterative procedure, shown in FIG. 3, an initial point $x_o$ is chosen on grating $G_1$. The incoming ray $W_i$ of $λ_1$ is traced (solid line) from $x_o$ to a point $ξ_0$ on grating G2 in a chosen direction $β_1(x_o)$. The grating function of $G_1$ at $x_o$ is $$\phi_1(x_0) = \frac{2\pi}{\lambda_1}[v_1 \sin\beta_1(x_o) + \sin\beta_0], \quad (1)$$

where both $β_0$ and $β_1(x_0)$ are defined to be positive in FIG. 3. Without any loss of generality, it is assumed that the output wave for the refractive index $v=v_1$ emerges at an angle $ρ_1$ to the substrate plane. Hence, the grating function of $G_2$ on $ξ_0$ is $$\phi_2(\xi_0) = \frac{2\pi}{\lambda_1}(v_1 \sin\beta_1(x_o) + \sin\rho_1). \quad (2)$$

The refractive index form is now changed from $v_1$ to $v_2$ and, as a result of the change in the refractive index, the output wave emerges from the substrate at an angle $ρ_2$ to the substrate plane. The direction of the impinging ray at $ξ_0$ is $$v_2 \sin\beta_1^o(\xi_0) = \frac{\lambda_1}{2\pi}\phi_2(\xi_0) - \sin\rho_2 = v_1 \sin\beta_1(x_0) - \sin\rho_2 + \sin\rho_1. \quad (3)$$

Tracing a ray 26 into $G_1$ (dashed lines) calculates the grating function $\phi_1$ on $x_1$ as $$\phi_1(x_1) = \frac{2\pi}{\lambda_1}[v_2 \sin\beta_1^o(\xi_o) + \sin\beta_0] \quad (4)$$

$$= \frac{2\pi}{\lambda_1}[v_1 \sin\beta_1(x_o) - \delta\rho + \sin\beta_0],$$

where the constant $\delta\rho$ is defined as $\delta\rho \equiv \sin\rho_2 - \sin\rho_1$. By switching back to $v_1$, the procedure can continue and the input angle at $x_1$ is calculated to be $$v_1 \sin\beta_1(x_1) = \frac{\lambda_1}{2\pi}\phi_1(x_1) - \sin\beta_0 = v_1\sin\beta_1(x_0) - \delta\rho, \quad (5)$$

which yields $$\sin\beta_1(x_1) - \sin\beta_1(x_0) = \delta\rho/v_1 \quad (6)$$

Now, the iterative procedure continues to calculate $\phi_1$ and $\phi_2$ at the points $x_1, x_2, x_3\ x_i$ and $\xi_1, \xi_2, \xi_3 \ldots \xi_i$ respectively. Following the same procedure as in Equations 1-6, it can be found that for each $x_i$ $$\sin\beta_1(x_{i+1}) - \sin\beta_1(x_i) = \delta\rho/v_1 \quad (7)$$

With this iterative procedure, the desired grating functions $\phi_1$ and $\phi_2$ can be calculated only for a finite number of pairs. Knowing the discrete values of these functions, the values of the other points on the gratings can be calculated numerically by using interpolation methods, however, since the number of known values is comparatively small, the interpolation procedure may be complicated and time-consuming. Instead, analytic functions are presented herein, which are relatively easy to compute for an iterative procedure.

As shown in FIG. 3, the distance $\Delta x_i \equiv x_{i+1} - x_1$ that the tracing procedure "moves" each step along the x axis is approximately $$\Delta x_i \approx \frac{\Delta\beta_i}{\cos^2\beta_1(x_i)}, \quad (8)$$

where $\Delta\beta_i$ is given by $$\Delta\beta_i \approx \frac{\sin\beta_1(x_i) - \sin\beta_1^o(\xi_i)}{\cos\beta_1(x_i)} = \frac{\left(\frac{v_1}{v_2} - 1\right)\sin\beta_1(x_i) + \frac{\delta\rho}{v_2}}{\cos\beta_1(x_i)}. \quad (9)$$

Inserting Equation 9 into Equation 8 yields $$\Delta x_i \approx \frac{\left(\frac{v_1}{v_2} - 1\right)\sin\beta_1(x_i) + \frac{v_1}{v_2}\delta\rho}{\cos^3\beta_1(x_i)}. \quad (10)$$

Dividing Equation 10 by Equation 7 and generalizing the equation for each x on $G_1$ yields $$\frac{\Delta x}{\sin\beta_1(x+\Delta x) - \sin\beta_1(x)} = \frac{v_1}{v_2}\left[\frac{(v_1-v_2)\sin\beta_1(x)}{\cos^3\beta_1(x)\delta\rho} - \frac{1}{\cos^3\beta_1(x)}\right] \quad (11)$$

$$= \frac{a\sin\beta_1(x)}{\cos^3\beta_1(x)} - \frac{b}{\cos^3\beta_1(x)}$$

where the constants a and b are defined as $a \equiv (v_1-v_2)v_1/(v_2\delta\rho)$ and $b \equiv v_1/v_2$. Defining $f(x) \equiv \sin\beta_1(x)$ yields $$\frac{\Delta x}{f(x+\Delta x) - f(x)} = \frac{af(x)}{(1-f^2(x))^{\frac{3}{2}}} - \frac{b}{(1-f^2(x))^{\frac{3}{2}}}. \quad (12)$$

For a system with a small change in the refractive index, it may be assumed that $\Delta x \ll 1$. Hence, the following approximation may be written:

$$\frac{\Delta x}{f(x+\Delta x) - f(x)} \approx \frac{dx}{df}. \quad (13)$$

Inserting Equation 12 into Equation 13 yields the following differential equation:

$$\frac{dx}{df} = \frac{af(x)}{(1-f^2(x))^{\frac{3}{2}}} - \frac{b}{(1-f^2(x))^{\frac{3}{2}}}. \quad (14)$$

The solution of this equation is $$x = \frac{a-bf}{\sqrt{1-f^2}} + c_0, \quad (15)$$

where $c_0$ is found from the boundary condition ($f(x=0)=0$) to be $$c_0 = -a \quad (16)$$

Thus, the solution of Equation 15 is $$\sin\beta_1(x) = f(x) \quad (17)$$

$$= \frac{ab + \sqrt{(ab)^2 - (a^2 - (x+a)^2)(b^2 + (x+a)^2)}}{b^2 + (x+a)^2}.$$

Inserting Equation 18 into Equation 1 shows the grating function $\phi_1(x)$ of grating $G_1$ to be $$\phi_1(x) = \frac{2\pi}{\lambda_1}\left[v_1\frac{ab + \sqrt{\frac{(ab)^2 - (a^2 - (x+a)^2)}{(b^2 + (x+a)^2)}}}{b^2 + (x+a)^2} + \sin\beta_0\right]. \quad (18)$$

The grating function $\phi_2(\xi)$ of the second grating $G_2$ can be calculated by a similar procedure to that described above with regard to Equations 1-18. The result of these calculations is $$\phi_2(\xi) = \frac{2\pi}{\lambda_1}\left[a'b' + \sqrt{\frac{(a'b')^2 - (a'^2 - (x+a')^2)}{(b'^2 + (x+a')^2)}}\right], \quad (19)$$

where the constants a' and b' are now defined as $a' \equiv (v_1-v_2)v_1/(v_2\delta\rho)$ and $b \equiv v_1/v_2 - 1$.

It is important to note that the solution given in Equations 18 and 19 is not the most accurate analytical one, but rather, is an approximate solution, illustrating the capability of finding an easy and fast analytical solution for the aforementioned iterative process. However, for most cases, as will be described in further detail below, this solution is accurate enough.

In other cases, in which the system has a high numerical aperture, a diffraction-limited performance is required; hence, as the accuracy of the solution is crucial, a more accurate analytical solution must be found. This can be done by using a more accurate value for $\Delta x$ in Equation 10, or by finding higher coefficients in the power series of Equation 13. Furthermore, after calculating the values of $\phi_1$ and $\phi_2$ on the discrete points $x_1, x_2, x_3 \ldots x_i$ and $\xi_1, \xi_2, \xi_3 \ldots \xi_i$, respectively, as described earlier, a numerical or semi-numerical method can be employed to find the required accurate solution.

In addition, the solution, even the most accurate one, is computed for two discrete values of the refractive index, $v_1$ and $v_2$, but it can be assumed that for the dynamic range of $v = \{v_1 \Delta v/2, v_2 + \Delta v/2\}$, where $\Delta v \equiv v_2 - v_1$, a change of the refractive index to $v$ yields a deviation of the output wave to the direction $$\sin \rho^v = \sin \rho_1 + \delta \rho \cdot g(v), \tag{20}$$

where $g(v)$ is a monotonic function having the values of $g(v) = 0, 1$ for $v = v_1, v_2$, respectively. Since $g(v) = x$ is a continuous and monotonic function, the inverse function $g^{-1}(x) = v$ can also be found.

The angular steering of the output wave can be translated into linear scanning. As shown in FIG. 4, there are provided two gratings, $G_1$ and $G_2$, parallel to each other and located at the surfaces of a light-transmissive substrate 4, where the refractive index of the substrate can be dynamically controlled. A focusing lens 28 is provided at a certain distance from grating $G_2$, forming a focus at the imaging plane 30. The angular steering of the plane wave is converted by the focusing lens 28 into linear scanning of a point. Each plane wave, corresponding to a different refractive index, is focused by the focusing lens 28 onto the image plane 30, where the foci of the various plane waves are laterally displaced along a straight line.

The beam steering discussed above is performed only in the x axis. However, a two-dimensional scanner can easily be fabricated by combining two different parallel substrates, whereby the scanning direction of each substrate is normal to that of the other.

Another problem is that since the relation between the coordinates of the two gratings is $x = \xi + \tan \beta(\xi)$, the lateral dimension of the second grating is much smaller than that of the first grating in the x-axis, whereby the dimensions remain the same along the y-axis. That is, the output beam has a non-symmetrical form, whereby the lateral dimension along the y-axis is much larger than that along the x-axis. Apparently, this problem does not exist when the scanning system is composed of two substrates, as described above. But even for a single substrate configuration, this problem can be solved by contracting the wider dimension, using optical means such as a folding prism.

Thus far, the exploitation of the double grating configuration embedded on a light-transmissive substrate, mainly for scanning purposes, has been described. However, the same configuration could be used also for other applications, including wavelength-division multiplexing, optical switching, light intensity attenuation, light amplitude-modulation and many others.

Considering now the above-described system of Equations 1-19, in the special case where $\beta_0 = 0$ and the refractive index $v_1$ is fixed but the wavelength is changed from $\lambda_1$ to $\lambda$, the direction of the output ray for each point x on the first grating $G_1$ is $$v_1 \sin \beta_1^\lambda(x) = \frac{\lambda_2}{2\pi} \phi_1(x). \tag{21}$$

Inserting Equation 1 into Equation 21 yields $$v_1 \sin \beta_1^\lambda(x) = \frac{\lambda}{\lambda_1} v_1 \sin \beta_1(x). \tag{22}$$

Hence, $$\sin \beta_1^\lambda(x) = \frac{\lambda}{\lambda_1} \sin \beta_1(x). \tag{23}$$

However, in the former case, where the wavelength $\lambda = \lambda_1$ is fixed and the variable is the refractive index $v$, the direction of the output ray for each point x on the first grating $G_1$ is $$\sin \beta_1^v(x) = \frac{v_1}{v} \sin \beta_1(x). \tag{24}$$

Hence, the output direction for each point x on the grating $G_1$ is equal in both cases, that is $$\sin \beta_1^v(x) = \sin \beta_1^\lambda(x), \tag{25}$$

in a condition that $$\lambda = \frac{v_1}{v} \lambda_1. \tag{26}$$

Consequently, each ray with a direction $\sin \beta_1^v$ impinges on the second grating $G_2$ at a point $\xi$ where the grating function is $$\phi_2(\xi) = \frac{2\pi}{\lambda_1}(v \sin \beta_1(x) + \sin \rho^v). \tag{27}$$

The output direction for each point $\xi$ on $G_2$ is now $$\sin \rho^\lambda(\xi) = \frac{\lambda}{2\pi} \phi_2(\xi) - v_1 \sin \beta_1^\lambda(x). \tag{28}$$

Inserting Equations 25 and 27 into Equation 28 yields $$\sin \rho^\lambda(\xi) = \frac{\lambda}{\lambda_1} v \sin \beta_1(x) + \frac{\lambda}{\lambda_1} \sin \rho^v - \frac{\lambda}{\lambda_1} v \sin \beta_1(x). \tag{29}$$

Inserting Equations 20 and 26 into Equation 29 yields $$\sin\rho^\lambda(\xi) = \frac{\lambda}{\lambda_1}\sin\rho^v \quad (30)$$
$$= \frac{\lambda}{\lambda_1}(\sin\rho_1 + \delta\rho \cdot g(v))$$
$$= \frac{\lambda}{\lambda_1}\left(\sin\rho_1 + \delta\rho \cdot g\left(\frac{v_1\lambda_1}{\lambda}\right)\right).$$

Regarding now the more general case in which both the wavelength and the refractive index are variables, the direction of the output ray for each point x on the first grating $G_1$ is $$\sin\beta_1^{v,\lambda}(x) = \frac{v_1}{v}\frac{\lambda}{\lambda_1}\sin\beta_1(x). \quad (31)$$

This case is equivalent to changing only the refractive index to $v^\circ$, wherein $$v^\circ = \frac{v\lambda_1}{\lambda}. \quad (32)$$

Consequently, the output direction for each point $\xi$ on $G_2$ is $$\sin\rho^{v,\lambda}(\xi) = \frac{\lambda}{\lambda_1}\sin\rho^{v^\circ}. \quad (33)$$

Inserting Equation 20, where $v^\circ=v$, into Equation 33 yields $$\sin\rho^{v,\lambda}(\xi) = \frac{\lambda}{\lambda_1}(\sin\rho_1 + \delta\rho \cdot g(v^\circ)). \quad (34)$$

Inserting Equation 32 into Equation 34 yields $$\sin\rho^{v,\lambda}(\xi) = \frac{\lambda}{\lambda_1}\left(\sin\rho_1 + \delta\rho \cdot g\left(\frac{v\lambda_1}{\lambda}\right)\right). \quad (35)$$

Seemingly, $\sin \rho^{v,\lambda}(\xi) = \sin \rho^{v,\lambda}$ is a constant over the entire area of the grating $G_2$. As a consequence, the output beam is a plane wave. Therefore, the present invention can also be used as a wavelength-division multiplexing/demultiplexing device.

FIG. 5 illustrates the utilization of the double-grating configuration, constructed to provide a wavelength division demultiplexing system including an optical device 32 linking a single source fiber 34 and a plurality of receiving fibers at receiving locations $RL_1, RL_2, \ldots RL_n$. The source fiber 34 contains n different communication channels, $CC_1, \ldots CC_n$, with the wavelengths, $\lambda_1, \ldots \lambda_n$ respectively. The first grating $G_1$ couples the corresponding incoming channels 101, 102 into the light transmissive substrate 4, and the second grating $G_2$ couples them 131, 132 out and diffracts them into different directions. Each channel $CC_i$ is then focused by a focusing lens 36 onto its receiving fiber RL 35. The propagation direction of the waves can be inverted to provide a system which multiplexes a number of channels from their separated source fibers onto one receiving fiber. Since the light transmissive substrate can be located very close to the fibers, and the light waves are guided inside the substrate, the system can be compact and easy to use.

It is clear that the embodiment described above can also be used for WDM with a substrate composed of a material with a constant refractive index, that is, when $v=v_1$=const. However, it is advantageous to use materials in which the refractive index can be controlled. One of the main drawbacks of using a simple grating as a WDM device is that it is very sensitive to the signal wavelength, which is usually strongly dependant on the temperature. In addition, since the diameter of the fiber core is smaller than 10 microns, the tolerances of the optical system should be very tight, so as to prevent degradation of the optical signal due to even a slight change in the environmental conditions. The necessity for tightening the optical and the mechanical tolerances makes the optical system very expensive and even impractical. In contrast to a simple grating, in the system according to the present invention, changes in environmental conditions can be compensated dynamically by changing the refractive index. For example, since $g^{-1}(x)$ is a continuous and monotonic function, it is possible to find a refractive index v which fulfills the relation $$v = \frac{\lambda}{\lambda_1} \cdot g^{-1}\left(\frac{\lambda_1-\lambda}{\lambda} \cdot \frac{\sin\rho_1}{\delta\rho}\right), \text{ or} \quad (36)$$

$$g\left(\frac{v\lambda_1}{\lambda}\right) = \left(\frac{\lambda_1-\lambda}{\lambda} \cdot \frac{\sin\rho_1}{\delta\rho}\right), \quad (37)$$

which yields $$\sin\rho_1 = \frac{\lambda}{\lambda_1}\left(\sin\rho_1 + \delta\rho \cdot g\left(\frac{v\lambda_1}{\lambda}\right)\right). \quad (38)$$

Substituting Equation 35 into Equation 38 yields $$\sin \rho_1 = \sin \rho^{v,\lambda} \quad (39)$$

That is, the output has the original direction as if the system has the values of $v_1$ and $\lambda_1$. Consequently, compensation may be made for a change in the wavelength by changing the refractive index, and vice-versa. In addition, a taping element 35 attached to the receiving fibers and connected to a control unit 37 of the refractive index, can produce a closed-loop apparatus that will optimally control the performance of the optical system.

Another potential application of the present invention is as an optical switch. In the embodiment illustrated in FIG. 5, each one of the optical channels $CC_1 \ldots CC_n$, having the wavelengths, $\lambda_1 \ldots \lambda_n$ respectively, can be routed into one of the output locations $RL_1 \ldots RL_n$. The routing of the channel $CC_i$ to the output location $RL_1$ can be done by setting a refractive index $v_1^j$ that will solve the equation $$\sin \rho^{v,\lambda} = \sin \rho^{v_1,\lambda_j} \quad (40)$$

Inserting Equation 35 into Equation 37 yields the equation $$\frac{\lambda_i}{\lambda_1}\left(\sin\rho_1 + \delta\rho \cdot g\left(\frac{v_i^j\lambda_1}{\lambda_j}\right)\right) = \frac{\lambda_j}{\lambda_1}\left(\sin\rho_1 + \delta\rho \cdot g\left(\frac{v_1\lambda_1}{\lambda_j}\right)\right), \quad (41)$$

which has the solution $$v_i^j = \frac{\lambda}{\lambda_1} \cdot g^{-1}\left(\frac{\lambda_1 - \lambda}{\lambda} \cdot \frac{\sin\rho_1}{\delta\rho} + \frac{\lambda_j}{\lambda_i} g\left(\frac{v_1\lambda_1}{\lambda_j}\right)\right), \tag{42}$$

whereby $v_1$ is the original refractive index designated to rout each channel $CC_k$ to its respective default output location $RL_k$. Apparently, this embodiment can be generalized to produce an optical switch between n optical channels $CC_1 \ldots CC_n$ and m possible output locations $RL_1 \ldots RL_m$, wherein $n \neq m$.

Other potential applications of the present invention are in light intensity attenuation, or light amplitude modulation. In many fiber-optical applications, it is crucial to control the intensity of the light which is coupled into the fiber. The devices which are currently used for controlling coupled light intensity are mechanical attenuators in the main, which are fairly expensive and suffer from a slow time response. In the embodiment of FIGS. 6a and 6b, the exact direction of the optical wave $W_o$ emerging from the substrate 4 can be controlled by changing the refractive index of the substrate. Angular steering of the wave is converted into linear shifting of the focused wave by means of converging lens 36. Hence, the exact portion of the focused wave to be coupled into the receiving fiber RL can be set, and the device can be operated as an optical intensity attenuator (FIG. 6b). In addition, since the time response of the change in the refractive index is usually very fast, an intensity modulation of the coupled wave can be performed with this device.

Another potential utilization of the present invention is as a monochromator. There are many applications in which it is desired to produce a monochromatic beam out of an optical wave having a much wider spectrum, where the exact selected wavelength of the output should be set dynamically during the operation of the device. As described above for optical switching, if the detector receives light only from a pre-determined direction, the desired wavelength can be set to emerge at that direction by setting the appropriate refractive index. In addition, this device can also be used as a spectrometer by measuring the intensity of the output wave as a function of the wavelength.

The embodiments described above are merely examples illustrating the implementation capabilities of the present invention. The invention can also be utilized in many other potential applications, including, but not limited to, angular drivers for laser range-finders, dynamic aiming systems, laser beam steerer for CD-ROM readers and others, where dynamic control of the direction of an optical wave is desired.

Another issue to be considered, and related principally to the utilization of the system for scanning purposes, is the dimensions of the light transmissive substrate. The relation between the apertures of the first grating $G_1$ and the second grating $G_2$ is given by $$x_{max} = \xi_{max} + \tan\beta_1^o(\xi_{max}), \tag{43}$$

where $x_{max}$ and $\xi_{max}$ are the apertures of the gratings $G_1$ and $G_2$, respectively. It can be seen that there are two contrary considerations for choosing $\xi_{max}$. On the one hand, the size of the coupler aperture increases with $\xi_{max}$; hence, for a given aperture, increasing $\xi_{max}$ decreases d, and thereby a more compact system is obtained. On the other hand, the aberrations of the output wave also increase with $\beta_1(\xi_{max})$, which increases monotonically with $\xi_{max}$; hence, by increasing $\xi_{max}$, the performance of the system is decreased. With these considerations, one might think that an optimal value of $\xi_{max}$ to be chosen for each different design, according to the desired system size and optical performance. Unfortunately, this optimal value of $\xi_{max}$ usually does not exist. For example, a typical scanner aperture can be approximately a few tens of mm, while the thickness of the substrate cannot be more than 20-30 mm. On the other hand, the aberrations for $\xi_{max} > 2 \cdot d$ are such that the optical performance is less than the diffraction limit. This limitation might be overcome by assembling an array of n identical gratings, given by $$G_j = \sum_{i=1}^{n} G_j^i \quad j = 1, 2, \tag{44}$$

where $G_j^k = G_j^i$ for $1 \leq i, k \leq n$. For all $1 \leq i \leq n$ the grating $G_1^i$ is constructed in relation to the second grating $G_2^i$.

Since the first grating $G_1$ is constructed of a large number of facets, the diffraction efficiencies of these facets should be properly set so as to achieve uniform illumination on the second grating G. In addition, special care should be taken to avoid spaces between the elements $G_1^i$, in order to avoid loss of energy and to ensure an output wave with uniform intensity. To guarantee this, the coordinate $x_{max}^i$ of the facet $G_1^i$ should be identical to the coordinate $x^{i+1} = 0$ of the adjacent facet $G_1^{i+1}$. The total area of the grating $G_1$ is given by $$RL(G_1) = n \cdot x_{max} = n \cdot (\xi_{max} + \tan\beta_1(\xi_{max})) \tag{45}$$

For a given system, the parameter $\xi_{max}$ is calculated according to the desired performance and $RL(G_1)$ is set according to the system aperture. Hence, it is possible to calculate the required number of facets n, from Equation 45.

An alternative manner of reducing the thickness of the substrate in order to achieve a more compact system is illustrated in FIG. 8. The wave $W_1$, coupled inside the substrate by means of grating $G_1$, does not proceed directly to the second grating $G_2$, but is first reflected a few times off the surfaces 38, 40 of the substrate 4. This reflectance can be induced by a reflective coating on the surfaces of the substrate or, if the coupling angles are high enough, by total internal reflection. In any case, the actual thickness of the substrate is $d_{act} = d/(n+1)$, where n is the number of reflections of the substrate surfaces. Care should be taken to avoid overlap between the coupled wave after the first reflection and the active area of the gratings. In the original embodiment, which is described above, the light proceeds directly from $G_1$ to $G_2$, and hence the gratings are located on opposite sides of the substrate. There are however, configurations with an odd number of reflections from the substrate surfaces, in which the input and the image waves could be located on the same side of the substrate.

An example of the device of FIG. 8 has the following parameters:

$$\delta\rho/(v_2 - v_1) = 5; \ v_1 = 1.5; \ \lambda_1 = 1.5 \ \mu m; \ d = 30 \ mm; \ \rho_1 = 20°;$$
$$\beta_0 = 0 \tag{46}$$

The maximum dispersion as a function of the refractive index for a double grating designed according to Equations 18 and 19 can be calculated. The dispersion in the band is $v_1 \pm \Delta v/2$, where $\Delta v \equiv 0.02 v_1$, and where $x_{max}$, is $d/3 = 10$ mm, hence, $\xi_{max}$ is set to be ~1 mm. As a result, the diffraction limit of the system is approximately 1.5 milliradians. The beams are reflected twice off the surfaces of the substrate, hence, the actual thickness of substrate 4 is 10 mm.

FIG. 9 shows the angular dispersion as a function of the refractive index (normalized to $v_1$). It is evident from this Figure that the maximal dispersion of the double grating is only 0.4 milliradians, which is actually a diffraction limited performance for the system defined in Equation 46. It is even possible to increase the system aperture by a factor of three and still achieve a nearly diffraction limited performance of 0.5 milliradians.

FIG. 10 shows the output angle from the second grating as a function of the refractive index normalized to $v_1$, for the system defined in Equation 46. The system has a scanning range of 100 milliradians ($\sim 6°$) for a refractive index with a dynamic range of $\Delta v = 0.02 v_1$.

FIG. 11 illustrates the utilization of the present invention as an optical switch and/or as a monochromator. The figure depicts the wavelength, at an output angle of $\rho = 20°$, as a function of the refractive index. By combining the results of FIGS. 10 and 11, it is clear to see that a wavelength change of $\Delta\lambda = 15$ nm yields an angular deviation of 0.5 milliradians, which illustrates the performance of the device as a WDM. An even better spectral sensitivity can be achieved by selecting higher deviation ratio ($\delta\rho/(v_2-v_1)$) for the system.

FIGS. 12a and 12b show the grating period (in line-pairs/mm) of the gratings $G_1$ and $G_2$ as a function of x (FIG. 12a) and $\xi$ (FIG. 12b), respectively. Both functions monotonically increase with $\xi$ and x, and the fabrication process for both gratings should be fairly simple. Furthermore, other gratings with constant grating periods, which can be easily fabricated by conventional techniques such as holographic recording or photo-lithography, may be added to the surfaces of the substrate. As a result, the maximal grating period values of the gratings $G_1$ and $G_2$ can be less than 250 line-pairs/mm.

A combination of the embodiments described above can be utilized to materialize an all-optical switching system, having as an input n communication channels and n different wavelengths $\lambda_1 \ldots \lambda_n$, and as an output m, receiving channels $RC_1 \ldots RC_m$ (not shown).

FIG. 13 illustrates a side view (a projection on the $\epsilon$-$\zeta$ plan) of the first stage of the switching system. The n input channels 42 are coupled by a diffraction grating $G_1$ into the substrate 4, at a location where the substrate is constructed of a passive material. The pair of gratings $G_1$, $G_2$ is used to perform the wavelength-division-demultiplexing, using the method described above with reference to FIG. 5. The second grating traps the output waves inside the substrate by total internal reflection.

FIG. 13 illustrates how a lateral separation between two different channels 44, 46, having the wavelengths $\lambda_i$ and $\lambda_j$, respectively, can be obtained. After a total lateral separation between the channels is achieved, an array of gratings 48₁ to 48ₙ is used to rotate the trapped waves in such a way that the propagation direction of the separated waves is along the $\eta$ axis, which is normal to the figure plan.

FIG. 14 depicts a side view (a projection on the $\eta$-$\zeta$ plan) of the second stage of the switching system. After rotation by the gratings 48, the trapped waves impinge on an array of gratings 50, where the substrate at this location is constructed of a dynamic material having a refractive index that can be controlled by an external voltage. Though it cannot be seen in the Figure, it is noted that the different channels are laterally separated along the $\xi$ axis, where each channel 44, 46 has its respective pair of gratings 50, 52 and a separate part of the substrate where the refractive index of each part can be separately controlled. Each pair of gratings 50, 52 is used to control the output angles of the channels 44, 46, using the method described above with reference to FIG. 3. The gratings array 54 couples the trapped waves from the substrate onto a coupling optics 56, 58 to focus the waves into their respective receivers 60, 62.

For a multi-stage optical switching system, an optional array of wavelength converters 64, 66 can be inserted into the optical pass of the waves, in order to convert the wavelength of the wave, which is routed into a receiver $RC_k$ into the wavelength $\lambda_k$.

Another subject which should be addressed is the polarization of the incoming light. It is well known that it is simpler to design and fabricate diffracting gratings or elements using the electro-optic effect for S-polarized light than it is for non-polarized or P-polarized light. There are cases where light sources like VCSELs (Vertical Catity Surface Emitting Lasers) are linearly polarized. However, there are many cases, especially those associated with fiber-optical communication, where the polarization of the incoming-beam is unknown.

This problem can be solved by utilizing a half-wavelength plate and a polarizing beam-splitter. As illustrated in FIG. 16, light beam 64, having undefined polarization, emerges from a light source 66 and impinges on a polarizing beam-splitter 68. The part of the light beam 70 having P-polarization continues in the same direction, while the S-polarized light beam 72 is reflected and impinges on a folding mirror 74 which reflects the light again to its original direction. By using a half-wavelength plate 76, it is possible to rotate the polarization of the P-polarized light such that it is S-polarized in relation to the grating plane. In such a way, the grating $G_1$ is illuminated with S-polarized light. This solution suffers, however, from two main problems: First, the cross-section of the incoming beam is not symmetrical any more. That is, the lateral dimension of the beam in the $\xi$-axis is twice as much as the lateral dimension in the $\eta$-axis. In addition, since the polarization of the incoming beam is unknown and can be in any orientation, there is uncertainty regarding the energy distribution of the incoming beam along the $\xi$-axis. This undesgined energy distribution presents a drawback for optical systems where a diffraction-limited performance is required.

FIG. 17 illustrates a modified version of FIG. 16, which solves these two problems. After crossing the half-wavelength plate 76, the light beam 70 is rotated by the folding mirror 78 and then combined with the light beam 72, using a 50% beam-splitter 80. The grating $G_1$ is illuminated now by an S-polarized, uniform and symmetrical light beam 82. Half of the incoming energy 84 is lost during this process, but usually the energy of the incoming light beam is high enough to stand this loss.

Not only S-polarized incoming beams, but also any other linearly polarized light beams, can be created with the system described above.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An optical device for the transmission of optical signals of different wavelengths from a single source to a plurality of receiving channels, comprising:

at least two major surfaces, a first surface and a second surface delimiting a medium wherein the medium between the surfaces is composed of light-transparent material having a constant refractive index;

a first grating ($G_1$) and a second different grating ($G_2$), stationary with respect to each other, each having an X-axis and a Y-axis, located on at least one of the major surfaces, at a constant distance from each other, wherein the two gratings are invariant in the Y-axis and solely dependent on the X-axis, each of the gratings, having a lateral dimension, with at least one sequence of a plurality of parallel lines, wherein the spacing between the lines of the first grating ($G_1$) gradually increases in a direction away from an edge of the grating up to a maximum distance, and wherein the spacing between the parallel lines of the second grating ($G_2$) increases in the same direction as the spacing of the first grating;

a light source emitting light waves in a given spectral range, at least a first light wave (101) having a first wavelength and a second light wave (102) having a second wavelength, different from the wavelength of the first light wave (101) emanating from the light source, impinging on the first grating ($G_1$) as plane waves in the same direction, the first and second light waves (101, 102) diffracted by the first grating ($G_1$), and subsequently diffracted as output plane waves by the second grating ($G_2$), the first and second light waves (101, 102) impinging on the first grating at different portions along the X-axis being diffracted by the first grating ($G_1$) in different directions toward the second grating, and traverse the second grating ($G_2$), the diffracted first light wave (101) and second light wave (102) being diffracted respectively by the second grating in a first output direction and a second output direction, wherein the first and second output directions are different and directed to two receiving channels (35).

2. The device according to claim 1, wherein the output light waves have a diffraction limited performance.

3. (Presently Presented) The device according to claim 1, further comprising a plurality of optical transmission paths, one for each receiving channel, and a single optical transmission path for all the channels.

4. The device according to claim 3, wherein each of the optical transmission paths is an optical fiber.

5. The device according to claim 3, wherein the device multiplexes the optical signals transmitted from the a plurality of optical transmission paths to the a single optical transmission path.

6. The device according to claim 3, wherein the device demultiplexes the optical signals transmitted from the single optical transmission path to the plurality of optical transmission paths.

7. The device according to claim 1, further comprising a light transmissive substrate, wherein said two major surfaces are located on external surfaces of the substrate.

8. The device according to claim 1, wherein the dimension of the second grating along the X-axis is smaller than the dimension of the first grating along the X-axis, while the dimensions of the gratings along the Y-axis are substantially the same.

9. An optical device for transmission of optical signals to a plurality of receiving channels of different wavelengths, the device defining an angular dispersion and comprising at least two major surfaces, a first surface and a second surface delimiting a medium, wherein the medium between the surfaces is composed of a light-transparent material with a constant refractive index;

a first grating ($G_1$) and a second different grating ($G_2$), stationary with respect to each other, each having an X-axis and a Y-axis, located on at least one of the major surfaces, at a constant distance from each other wherein the grating functions of the two gratings are invariant in the Y-axis and depend solely on the X-axis;

each of the gratings, having a lateral dimension, includes at least one sequence of a plurality of parallel lines, wherein the spacing between the lines of the first grating ($G_1$). gradually increases in a direction away from an edge of the grating up to a maximum distance, and wherein the spacing between the parallel lines of the second grating ($G_2$) increases in the same direction as the spacing of the first grating;

a light source emitting collimated light waves located in a given spectral range between a first wavelength and a second wavelength;

at least two input collimated light waves, each having a specific wavelength in the given spectral range emanating from the light source, diffracted by the first grating ($G_1$), and subsequently traverse the second grating ($G_2$) and diffracted as output plane light waves by the second grating ($G_2$) in different output directions;

the output direction of each light wave determined by the wavelength of the light beam waves;

wherein the angular dispersion between the two different light beams waves diffracted by the second grating, is at least 5 milliradians over 1.5 nm.

10. The device according to claim 9, wherein the maximal grating period values of the two gratings is less than 250 line-pairs/mm.

11. The device according to claim 9, wherein the width of the spectral range is at least 2% of the central wavelength of the spectral range.

12. The device according to claim 9, wherein the central wavelength of the spectral range is around 1.5 µm.

13. An optical device for transmission of optical signals to a plurality of receiving channels of different wavelengths, the device comprising at least two major surfaces, a first surface and a second surface delimiting a medium, wherein the medium between the surfaces is composed of a light-transparent material with a constant refractive index;

a first grating ($G_1$) and a second different grating ($G_2$), stationary with respect to each other, each having an X-axis and a Y-axis, located on at least one of the major surfaces, at a constant distance from each other, wherein the grating functions of the two gratings are invariant in the Y-axis and depend solely on the X-axis;

each of the gratings, having a lateral dimension, and including at least one sequence of a plurality of parallel lines, wherein the spacing between the lines of the first grating ($G_1$) gradually increase in a direction away from an edge of the grating up to a maximum, and wherein the spacing between the parallel lines of the second grating ($G_2$) increase in the same direction as the spacing between the parallel lines of the first grating;

a light source emitting collimated light waves located in a given spectral range between a first wavelength and a second wavelength;

at least two collimated light waves (101, 102) each having a specific wavelength in the given spectral range emanating from the light source, diffracted by the first grating ($G_1$), the light waves impinging on the first grating ($G_1$) are directed towards the second grating ($G_2$), traverse the second grating and subsequently diffracted as output plane light waves (131, 132) by the second grating ($G_2$) in different output directions, the output direction of each light wave determined by the wavelength of the light waves;

wherein the two light waves having the first and second wavelengths, respectively, are diffracted by the second grating ($G_2$) into first and second directions, respectively, the ratio of the difference between the first and second directions and the difference between the first and second wavelengths, is at least 5 milliradians over 1.5 nm.

14. The device according to claim 13, wherein the maximal grating period values of the two gratings is less than 250 line-pairs/mm.

15. An optical device for the transmission of optical signals from a plurality of emitting channels (35) of different wavelengths to a single receiver (34), the device comprising:
- at least two major surfaces, a first surface and a second surface delimiting a medium, wherein the medium between the surfaces is composed of light-transparent material having a constant refractive index;
- a first grating ($G_2$) and a second different grating ($G_1$), stationary with respect to each other, each grating having an X-axis and a Y-axis, located on at least one of the major surfaces, at a constant distance from each other, the two gratings being invariant in the Y-axis and solely dependent on the X-axis, each of the gratings, having a lateral dimension, with at least one sequence of a plurality of parallel lines, wherein the spacing between the lines of the first grating ($G_2$) gradually increases in a direction away from an edge of the grating up to a maximum distance between the lines, and wherein the spacing between the parallel lines of the second grating ($G_1$) increases in the same direction as the spacing of the first grating;
- at least a first and a second light source (35) each emitting light waves in a given spectral range between a first wavelength and a second wavelength;
- the light emanating from the first and second light sources impinging on the first grating ($G_2$) as plane waves from two different directions, being diffracted by the first grating ($G_2$) traverses the second grating ($G_1$), and subsequently diffracted as output plane waves by the second grating ($G_1$), the light waves impinging on the first grating ($G_2$) at different points along the X-axis being diffracted by the first grating ($G_2$) in different directions toward the second grating ($G_1$);
- all light waves diffracted by the second grating ($G_1$) being diffracted at an output direction which is the same for all the light waves, and are directed into a single receiving channel (34).

16. An optical device for the transmission of optical signals of different wavelengths from a single source to a plurality of receiving channels, comprising:
- at least two major surfaces, a first surface and a second surface delimiting a medium, wherein the medium between the surfaces is composed of light-transparent material having a constant refractive index;
- a first grating ($G_1$) and a second different grating ($G_2$), stationary with respect to each other, each having an X-axis and a Y-axis, located on at least one of the major surfaces, at a constant distance from each other, wherein the two gratings are invariant in the Y-axis and solely dependent on the X-axis;
- each of the gratings, having a lateral dimension, with at least one sequence of a plurality of parallel lines, wherein the spacing between the lines of the first grating ($G_1$) gradually increases in a direction away from an edge of the grating up to a maximum distance, and the spacing between the parallel lines of the second grating ($G_2$) increases in the same direction as the spacing of the first grating ($G_1$);
- the first grating ($G_1$) having at least a first and a second point along the X-axis, and the second grating ($G_2$) having at least a first, a second and a third point along the X-axis;
- a light source (34) emitting light waves located in a given spectral range;
- at least a first light wave (101) having a first wavelength ($\lambda_1$) and a second light wave (102) having a second wavelength ($\lambda_2$) different from the wavelength of the first light wave (101), emanating from the light source (34), impinging on the first grating ($G_1$) as plane waves in the same direction, each of the light waves (101, 102) having at least a first ray (111) and second ray (112), the first and second light waves (101, 102) diffracted by the first grating ($G_1$), traverses the second grating ($G_2$), and subsequently diffracted as output plane waves (131, 132) by the second grating ($G_2$);
- the first (111, 121) and second (112, 122) rays of the first (101) and second (102) light waves impinge on the first grating ($G_1$) in the same direction at the first ($X_1$) and second ($X_2$) point, respectively;
- the first (111, 121) and second (112, 122) rays of the first (101) and second (102) light waves are diffracted by the first grating (G) in different directions;
- the first (111) and second (112) rays of the first (101) light wave impinge on the second grating ($G_2$) at the first ($\xi_0$) and second ($\xi_1$) points respectively;
- the first (121) and second (122) light rays of the second (102) light wave impinge on the second grating ($G_2$) at the second ($\xi_1$) and third ($\xi_2$) points, respectively;
- the rays of each the first light wave (101) and second light wave (102) being diffracted by the second grating ($G_2$) in a first (131) output direction and a second (132) output direction respectively;
- wherein the first (131) and second (132) output directions are different and directed to two receiving channels.

17. An optical device for the transmission of optical signals of different wavelengths from a plurality of sources (35) to a single receiving channel (34), the device comprising:
- at least two major surfaces, a first surface and a second surface delimiting a medium, wherein the medium between the surfaces is composed of light-transparent material having a constant refractive index;
- a first grating ($G_2$) and a second different grating ($G_1$), stationary with respect to each other, each grating having an X-axis and a Y-axis, located on at least one of the major surfaces, at a constant distance from each other, wherein the two gratings are invariant in the Y-axis and solely dependent on the X-axis, each grating having a lateral dimension, with at least one sequence of a plurality of parallel lines, wherein the spacing between the lines of the first grating ($G_2$) gradually increases in a direction away from an edge of the grating up to a maximum distance between the lines, and wherein the spacing between the parallel lines of the second grating ($G_1$) increases in the same direction as the spacing of the first grating ($G_2$);
- the first grating ($G_2$) having at least a first, a second and a third point along the X-axis and the second grating ($G_1$) having at least a first and a second point along the X-axis;
- at least a first and a second light source ($RL_1$, $RL_2$) each light source emitting light waves in a given spectral range between a first wavelength and a second wavelength;
- the light waves emanating from the light sources ($RL_1$, $RL_2$,) impinging on the first grating ($G_2$) as plane waves from two different directions (131, 132), being diffracted by the first grating ($G_2$) traverses the second grating ($G_1$), and subsequently diffracted as output plane waves (101, 102) by the second grating ($G_1$);

each of the impinging light waves having at least a first (112, 122) and a second (111, 121) ray;

the first ray (112) and the second ray (111) of the first light wave from the first light source ($RL_1$) impinging on the first grating ($G_2$) in the same direction (131) at the first ($\xi_2$) and the second ($\xi_1$) points, respectively;

the first ray (122) and the second ray (121) of the light wave from the second light source ($RL_2$) impinging on the first grating ($G_2$) in the same direction (132) at the second ($\xi_1$) and the third ($\xi_0$) points, respectively;

the first (112, 122) and the second (111, 121) rays of the light waves are diffracted by the first grating ($G_2$) in different directions;

the first (112, 122) and second (111, 121) rays impinge on the second grating($G_1$) at the first ($X_2$) and second ($X_1$) points, respectively;

the first and second light waves being diffracted by the second grating ($G_1$) in a direction which is the same direction and into a single receiving channel (34).

\* \* \* \* \*